(12) United States Patent
Saldana et al.

(10) Patent No.: US 6,486,461 B1
(45) Date of Patent: Nov. 26, 2002

(54) METHOD AND SYSTEM FOR REGULATING A HIGH VOLTAGE LEVEL IN A POWER SUPPLY FOR A RADIATION DETECTOR

(75) Inventors: Michael R. Saldana, New Braunfels, TX (US); Jerry D. Porter, Dallas, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/495,018

(22) Filed: Jan. 31, 2000

(51) Int. Cl.$^7$ ............................................. H01J 40/14
(52) U.S. Cl. ................................. 250/214 VT; 323/355
(58) Field of Search ........................ 250/214 VT, 207, 250/214.1, 214 R, 214 C; 323/355; 313/103 CM, 105 CM, 103 R, 105 R

(56) References Cited

U.S. PATENT DOCUMENTS 3,624,530 A * 11/1971 Zwirn ............................ 330/3
4,044,249 A * 8/1977 Moore, Jr. et al. ..... 250/213 VT
5,883,381 A * 3/1999 Saldana ................. 250/214 VT
6,297,494 B1 * 10/2001 Estrera et al. ........ 250/214 VT

* cited by examiner

*Primary Examiner*—Kevin Pyo
*Assistant Examiner*—Seung C. Sohn
(74) *Attorney, Agent, or Firm*—Baker Botts L.L.P.

(57) ABSTRACT

A method for regulating a signal level in a power supply for a microchannel plate in a radiation detector is provided. The method includes receiving an input signal at a signal multiplier. The signal multiplier has an output terminal and a return terminal. An output signal is produced at the output terminal. The output signal is provided to the microchannel plate. A regulation signal is provided from the output terminal to the return terminal. A signal level of the output signal is regulated with the regulation signal.

10 Claims, 2 Drawing Sheets

METHOD AND SYSTEM FOR REGULATING A HIGH VOLTAGE LEVEL IN A POWER SUPPLY FOR A RADIATION DETECTOR

TECHNICAL FIELD OF THE INVENTION

This invention relates generally to vision systems and more particularly to a method and system for regulating a signal level in a power supply for a radiation detector.

BACKGROUND OF THE INVENTION

There are numerous radiation detectors. One type of detector employs an image intensifier tube and is used in night vision devices to amplify light and allow a user to see images in very dark conditions. Night vision devices typically include a lens to focus light onto the light receiving end of an image intensifier tube and an eyepiece at the other end to view the enhanced imaged produced by the image intensifier tube.

Modern image intensifier tubes use photocathodes. Photocathodes emit electrons in response to photons impinging on the photocathodes. The electrons are produced in a pattern that replicates the original scene. The electrons from the photocathode are accelerated towards a microchannel plate. A microchannel plate is typically manufactured from lead glass and has a multitude of microchannels, each one operable to produce a cascade of secondary electrons in response to an incident electron.

Therefore, photons impinge on the photocathode producing electrons which are then accelerated to a microchannel plate where a cascade of secondary electrons are produced. These electrons impinge on a phosphorous screen, producing an image of the scene.

The electrons are accelerated from the photocathode to the microchannel plate and from the microchannel plate to the phosphorous screen by electrostatic fields in the image intensifier. These electrostatic fields are established by power supplies to the photocathode, the microchannel plate and the screen. A conventional power supply for a microchannel plate has a relatively high output impedance. In addition, the current drawn by the microchannel plate varies strongly as a function of temperature and as a function of the average brightness of the image. Thus, the voltage across the microchannel plate varies strongly as a function of temperature and as a function of average image intensity if the voltage to the microchannel plate is unregulated.

A conventional power supply to a microchannel plate generates an oscillating signal that is fed into a transformer, with the output of the transformer being applied to a voltage multiplier. The output of the voltage multiplier is then applied to the microchannel plate. This voltage applied to the microchannel plate is generally regulated through the use of a feedback signal generated by a separate winding of the transformer. This feedback signal is scaled down and compared to a reference voltage, generating an error signal which is used to modify the oscillator amplifier that drives the transformer.

This conventional method of regulating the voltage has several drawbacks. One drawback is that a separate transformer is generally required to generate and control the voltage applied to the microchannel plate. A separate transformer increases cost, reduces reliability and reduces power supply efficiency for the image intensifier. A second drawback is that load regulation is very poor due to the relatively high output impedance of the voltage multiplier coupled with the fact that a separate transformer winding is used for feedback, with its independently associated temperature drift.

Recently, an improved voltage regulator was described in U.S. Pat. No. 5,883,381. This voltage regulator utilizes high-side control whereby the voltage is regulated with a variable impedance element in series with the output of a voltage multiplier. However, this high-side series voltage regulator is cumbersome, requiring relatively large components and a high parts count.

SUMMARY OF THE INVENTION

In accordance with the present invention, the disadvantages and problems associated with previous microchannel plate power supplies have been substantially reduced or eliminated. In particular, the present invention provides an improved method and system for regulating a signal level in an image intensification power supply.

In one embodiment, a method is provided for regulating a signal level in a power supply for a microchannel plate in a radiation detector. The method includes receiving an input signal at a signal multiplier. The signal multiplier has an output terminal and a return terminal. An output signal is produced at the output terminal. The output signal is provided to the microchannel plate. A regulation signal is provided from the output terminal to the return terminal. A signal level of the output signal is regulated with the regulation signal.

In accordance with another embodiment, a signal regulator for regulating a signal level in a power supply for a microchannel plate in a radiation detector is provided. The signal regulator includes a signal multiplier. The signal multiplier has a first input terminal, a second input terminal, an output terminal, and a return terminal. A transformer has a first terminal coupled to the first input terminal of the signal multiplier and a second terminal coupled to the second input terminal of the signal multiplier. The transformer is operable to drive an input signal into the signal multiplier. An error integrator is coupled to the output terminal of the signal multiplier. A reference circuit and a drive are coupled to the error integrator. A variable impedance is coupled to the return terminal of the signal multiplier and is coupled to the drive. The drive is operable to adjust a level of the variable impedance. The variable impedance is operable to regulate an output signal produced at the output terminal of the signal multiplier.

Technical advantages of the present invention include providing an image intensification power supply with an improved regulator for a signal level. In particular, the voltage across the microchannel plate is regulated without requiring a separate transformer. In addition, fewer components, including a reduced number of high voltage components, are required in comparison with existing voltage regulators. As a result, cost and size are reduced, reliability and response time are improved, and the image intensifier power supply is made more efficient.

Other technical advantages of the present invention will be readily apparent to the those skilled in the art from the following figures, description and claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

Figure 1:
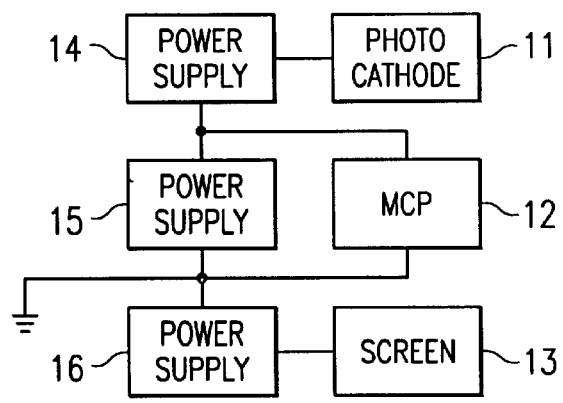
FIG. 1 is a block diagram illustrating an image intensifier tube including a power supply for a microchannel plate in accordance with one embodiment of the present invention.

The preferred embodiment of the present invention and its advantages are best understood by referring to FIGS. 1 through 2 of the drawings, like numerals being used for like and corresponding parts of the various drawings.

An image intensifier is a device that is capable of receiving photons from an image and transforming them into a viewable image. An image intensifier is designed to enhance viewing in varying light conditions, including conditions where a scene is visible with natural vision and conditions where a scene is invisible with natural vision because the scene is illuminated only by star light or other infrared light sources. However, it will be understood that, although an image intensifier may be used to enhance vision, an image intensifier may also be used in other applications involving photon detection, such as systems for inspecting semiconductors. One important component of a typical image intensifier is an image intensifier tube.

FIG. 1 is a block diagram illustrating an image intensifier tube 10 for use in an image intensifier. The image intensifier tube 10 includes a photocathode 11, a microchannel plate (MCP) 12, and a phosphorous screen 13. The image intensifier 10 also comprises a plurality of power supplies 14, 15 and 16. In operation, photons from an image impinge on an input side of the photocathode 11. The photocathode 11 converts photons into electrons, which are emitted from an output side of the photocathode 11 in a pattern representative of the original image. Typically, the photocathode 11 is a circular, disk-like structure manufactured from semiconductor materials mounted on a substrate. One suitable arrangement is gallium arsenide (GaAs) mounted on glass, fiber optics or other similarly transparent substrate.

The electrons emitted from the photocathode 11 are accelerated in a first electric field that is located between the photocathode 11 and an input side of the MCP 12. Thus, after accelerating in the first electric field which is generated by the power supply 14, the electrons impinge on the input side of the MCP 12.

The MCP 12 typically comprises a thin glass wafer formed from many hollow fibers, each oriented slightly off axis with respect to incoming electrons. The MCP 12 typically has a conductive electrode layer disposed on its input and output sides. A differential voltage, supplied by the power supply 15, is applied across the input and output sides of the MCP 12 to generate a second electric field. Electrons from the photocathode 11 enter the MCP 12 where they produce secondary electrons, which are accelerated by the second electric field. The accelerated secondary electrons leave the MCP 12 at its output side.

After exiting the MCP 12, the secondary electrons are accelerated in a third electric field that is located between the MCP 12 and the screen 13. The third electric field is generated by the power supply 16. After accelerating in the third electric field, the secondary electrons impinge on the screen 13, where a pattern replicating the original image is formed.

Figure 2A:
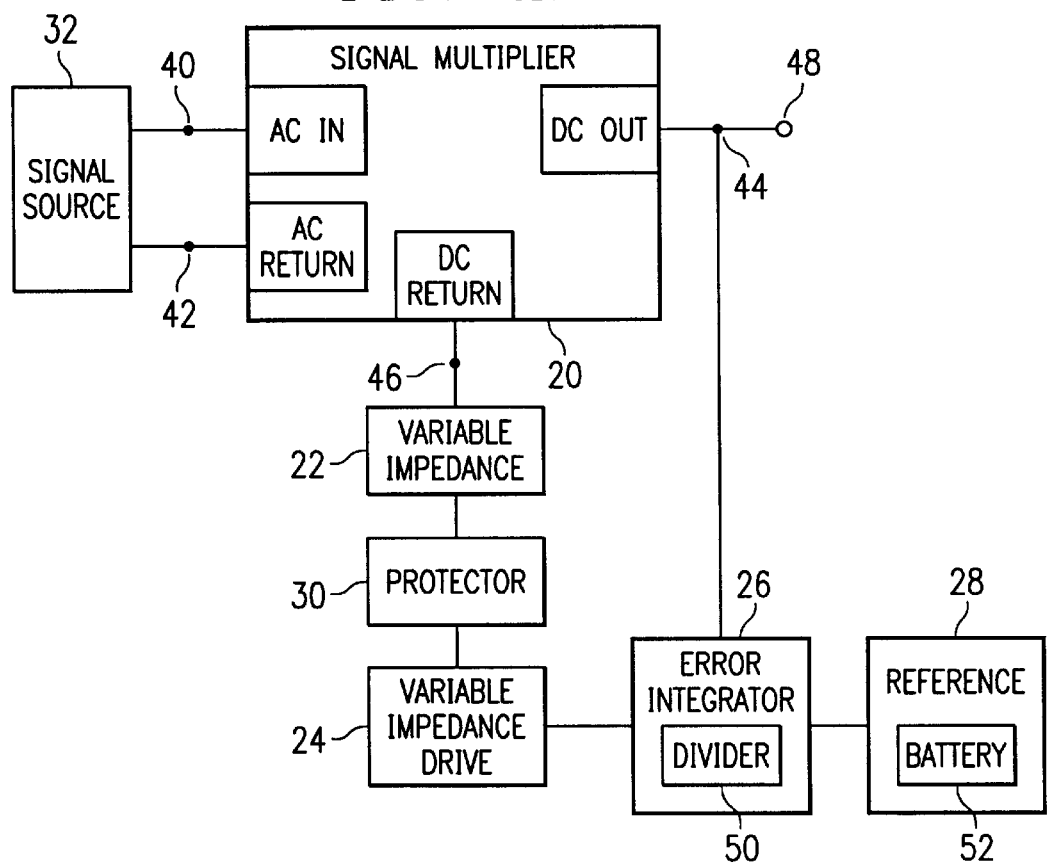
FIG. 2A is a block diagram illustrating a signal regulator for use in a power supply to a microchannel plate in accordance with one embodiment of the present invention.

FIG. 2A is a block diagram illustrating a signal regulator 18 for use in a power supply 15 to an MCP 12. It will be understood, however, that the signal regulator 18 may be incorporated into other suitable applications that utilize a regulated signal. The signal regulator 18 comprises a signal multiplier 20, a variable impedance 22, a variable impedance drive 24, an error integrator 26, a reference circuit 28, a protector circuit 30 and a signal source 32. The signal multiplier 20 comprises a first input terminal 40, a second input terminal 42, an output terminal 44 and a return terminal 46. According to one embodiment, the signal multiplier 20 comprises a voltage multiplier. The first input terminal 40 receives an AC input signal, the second input terminal 42 receives an AC return signal, the output terminal 44 produces a DC output signal, and the return terminal 46 produces a DC return signal. The signal source 32 provides the AC signals to the signal multiplier 20. The output terminal 44 is coupled to a regulator output terminal 48 that provides a regulated signal to the MCP 12. The error integrator 26 comprises a divider 50, and the reference circuit 28 comprises a battery 52.

In operation, the output terminal 44 provides a regulation signal to the return terminal 46 for regulating the output signal produced by the output terminal 44. The regulation signal comprises a feedback signal and a control signal, which further comprises a divided signal and an error signal. The output terminal 44 provides the feedback signal to the error integrator 26. In the error integrator 26, the divider 50 divides the feedback signal to produce the divided signal. The divided signal is then compared to a reference signal provided by the reference circuit 28 to the error integrator 26. Any difference between the divided signal and the reference signal is integrated by the error integrator 26 to produce the error signal. The error signal is provided to the variable impedance drive 24 which adjusts the impedance level of the variable impedance 22 based upon the error signal in order to regulate the output signal.

Figure 2B:
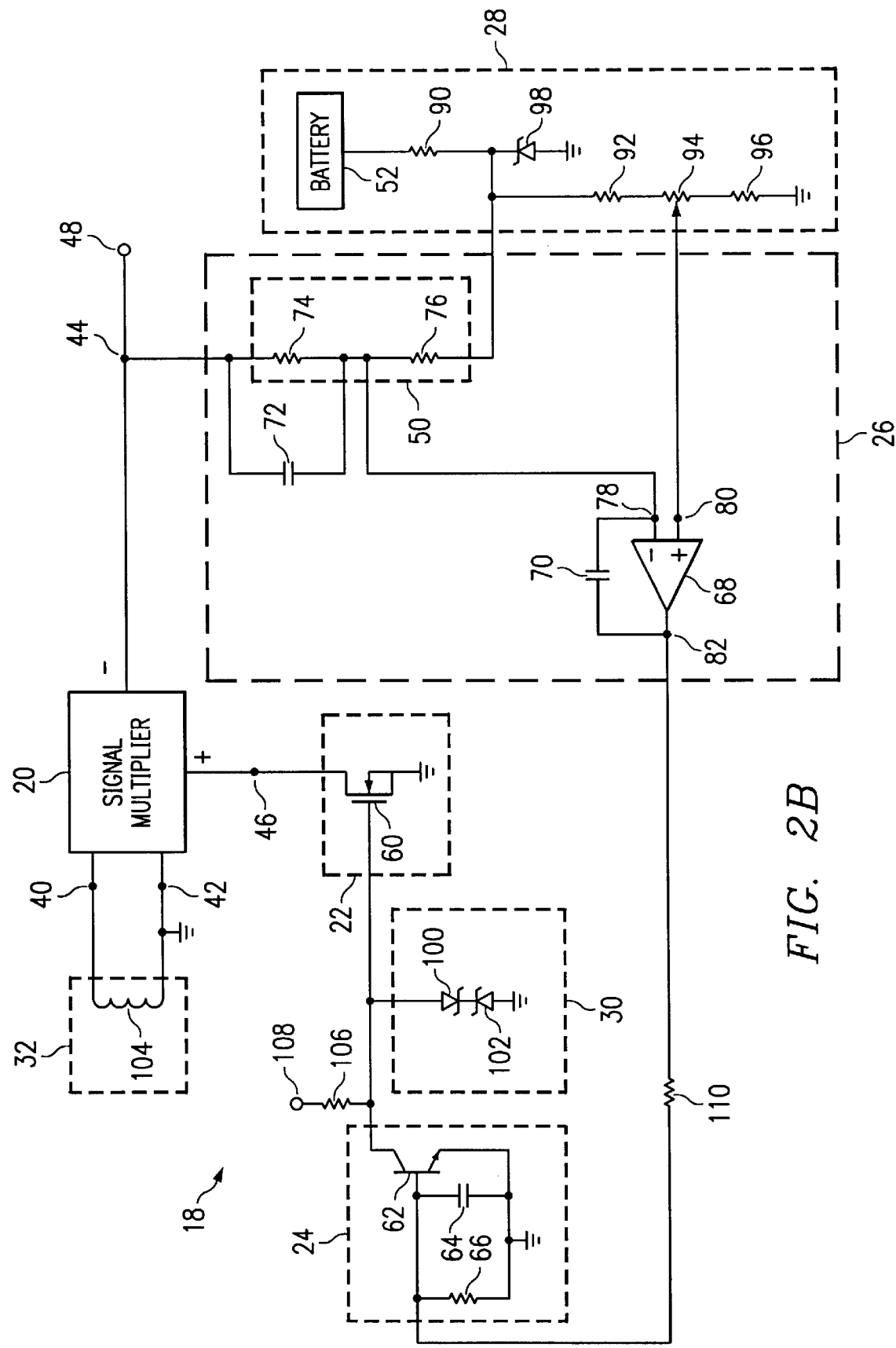
FIG. 2B is a block diagram illustrating one embodiment of the signal regulator of FIG. 2A constructed in accordance with the teachings of the present invention.

FIG. 2B is a block diagram illustrating an exemplary embodiment of the signal regulator 18 of FIG. 2A. According to the exemplary embodiment, the signal multiplier 20 comprises a voltage multiplier that multiplies an AC voltage input signal to produce a proportional DC voltage output signal. The variable impedance 22 may comprise a high voltage mosfet, a high voltage bipolar transistor, an insulated gated bipolar transistor, or other suitable high voltage transistor. According to the embodiment shown in FIG. 2B, the variable impedance 22 comprises an n-channel high voltage mosfet 60. The variable impedance drive 24 comprises a transistor 62, a capacitor 64, and a resistor 66. The capacitor 64 and the resistor 66 are coupled in parallel with each other and are coupled to the gate and drain of the transistor 62.

According to the exemplary embodiment, the error integrator 26 comprises an operational amplifier 68, a first capacitor 70, and a second capacitor 72, in addition to the divider 50. The divider 50 comprises a first resistor 74 and a second resistor 76. The operational amplifier 68 comprises a first operational amplifier input terminal 78, a second operational amplifier input terminal 80, and an operational amplifier output terminal 82. One terminal of the first capacitor 70 is coupled to the first operational amplifier input terminal 78, while the other terminal of the first capacitor 70 is coupled to the operational amplifier output terminal 82. In order to provide loop stability, the second capacitor 72 is coupled in parallel with the first resistor 74 of the divider 50. In addition to the first capacitor 70, the first operational amplifier input terminal 78 is also coupled to the first resistor 74 and the second resistor 76 of the divider 50.

The second operational amplifier input terminal 80 is coupled to the reference circuit 28.

In addition to the battery 52, the reference circuit 28 also comprises a plurality of resistors 90, 92, 94 and 96, as well as a band-gap voltage reference 98. The resistors 90, 92, 94 and 96 are coupled in series with each other. The battery 52 is coupled to resistor 90, and resistor 96 is grounded. One terminal of the band-gap voltage reference 98 is coupled to resistors 90 and 92, while the other terminal of the band-gap voltage reference 98 is grounded. The second operational amplifier input terminal 80 is adjustably coupled to the reference circuit 28 at resistor 94.

The protector circuit 30 comprises a pair of zener diodes 100 and 102 that are oppositely biased with respect to each other. Zener diode 100 is coupled to the variable impedance drive 24 and the variable impedance 22, while zener diode 102 is coupled to ground. The signal source 32 may comprise a transformer 104. The signal regulator 18 may further comprise a resistor 106 with one terminal coupled to a voltage source 108 and another terminal coupled to the protector circuit 30 and the variable impedance drive 24. Finally, the signal regulator 18 may also comprise a resistor 110 with one terminal coupled to the error integrator 26 and another terminal coupled to the variable impedance drive 24.

In operation, the transformer 104 drives an AC signal into the first input terminal 40 and the second input terminal 42 of the signal multiplier 20, which results in a multiplied DC signal across the output terminal 44 and the return terminal 46 of the signal multiplier 20. The return terminal 46 is separated from the second input terminal 42 of the signal multiplier 20 and is coupled to the drain of the n-channel high voltage mosfet 60. This mosfet 60 is a controllably variable impedance to ground from the return terminal 46 of the signal multiplier 20.

Driving the gate of the mosfet 60 with a positive voltage beyond a gate-to-source threshold voltage of the mosfet 60 results in a lower impedance from the return terminal 46 to ground. This results in an increasing negative voltage between the output terminal 44 and ground. Thus, the exemplary embodiment describes a negative output voltage regulator. However, it will be understood that a positive output voltage regulator may also be implemented in accordance with the teachings of the present invention.

The signal multiplier 20 provides a feedback signal to the divider 50, which provides a divided signal to the operational amplifier 68. The operational amplifier 68 integrates the difference, or error, between the divided signal and a reference signal from the reference circuit 28. The reference signal is adjustable to a desired level by way of resistor 94, which is a variable resistor.

When the negative voltage at the output terminal 44 is too low, the divided signal is more positive than the reference signal. In this situation, the signal at the operational amplifier output terminal 82 decreases, causing transistor 62 to conduct less. This causes the voltage at the gate of the mosfet 60 to increase, which results in an increase in the negative voltage at the output terminal 44. Conversely, when the negative voltage at the output terminal 44 is too high, the divided signal is more negative than the reference signal. In this situation, the signal at the operational amplifier output terminal 82 increases, causing transistor 62 to conduct more. This causes the voltage at the gate of the mosfet 60 to decrease, which results in a decrease in the negative voltage at the output terminal 44.

Thus, any difference between a desired signal level and the signal level at the output terminal 44 causes the signal regulator 18 to make an adjustment with the regulation signal that reduces or eliminates the difference. In this way, the signal provided by the signal regulator 18 at the regulator output terminal 48 is maintained at a relatively constant level.

While the invention has been particularly shown and described by the foregoing detailed description, it will be understood by those skilled in the art that various other changes in form and detail may be made without departing from the spirit and scope of the invention.

What is claimed is:

1. A method for regulating a signal level in a power supply for a microchannel plate in a radiation detector, comprising:
    receiving an input signal at at least one input terminal of a signal multiplier, the signal multiplier having an output terminal and a return terminal;
    producing an output signal at the output terminal, the output signal provided to the microchannel plate;
    providing a regulation signal from the output terminal to the return terminal, wherein providing the regulation signal comprises:
        coupling an error integrator comprising a divider to the output terminal, the divider operable to divide the output signal;
        coupling a drive to the error integrator;
        coupling a variable impedance to the drive and to the return terminal of the signal multiplier, the drive operable to adjust the variable impedance; and
        protecting the variable impedance with a protector circuit, the protector circuit comprising a first zener diode and a second zener diode, the first zener diode oppositely biased with reference to the second zener diode; and
    regulating a signal level of the output signal with the regulation signal.

2. A method for regulating a signal level in a power supply for a microchannel plate in a radiation detector, comprising:
    providing a signal multiplier comprising at least one input terminal, an output terminal and a return terminal;
    receiving an input signal at at least one input terminal;
    producing an output signal at the output terminal, the output signal provided to the microchannel plate;
    coupling a variable impedance to the output terminal and the return terminal;
    coupling a drive to the variable impedance;
    regulating a signal level of the output signal by adjusting the variable impedance with the drive; and
    protecting the variable impedance with a protector circuit, the protector circuit comprising a first zener diode and a second zener diode, the first zener diode oppositely biased with reference to the second zener diode.

3. A signal regulator for regulating a signal level in a power supply for a microchannel plate in a radiation detector, comprising:
    a signal multiplier having a first input terminal, a second input terminal, an output terminal, and a return terminal;
    a transformer having a first terminal coupled to the first input terminal of the signal multiplier and a second terminal coupled to the second input terminal of the signal multiplier, the transformer operable to drive an input signal into the signal multiplier;
    an error integrator coupled to the output terminal of the signal multiplier;

a reference circuit coupled to the error integrator;

a drive coupled to the error integrator;

a variable impedance coupled to the return terminal of the signal multiplier and coupled to the drive; and wherein the drive is operable to adjust a level of the variable impedance and the variable impedance is operable to regulate an output signal produced at the output terminal of the signal multiplier.

4. The regulator of claim 3, wherein the error integrator comprises a divider and an operational amplifier.

5. The regulator of claim 3, wherein the error integrator comprises an operational amplifier, a first resistor, a second resistor, a first capacitor, and a second capacitor and wherein:

the first resistor is coupled to the output terminal of the signal multiplier;

the first resistor is coupled in series with the second resistor;

the first capacitor is coupled in parallel with the first resistor;

the second capacitor is coupled between a first input terminal of the operational amplifier and an output terminal of the operational amplifier;

the first input terminal of the operational amplifier is coupled between the first and second resistors;

the second resistor is coupled to the reference circuit; and a second input terminal of the operational amplifier is coupled to the reference circuit.

6. The regulator of claim 3, wherein the reference circuit comprises a plurality of resistors, a zener diode, and a power source.

7. The regulator of claim 3, wherein the drive comprises a transistor.

8. The regulator of claim 3, wherein the variable impedance comprises a transistor selected from the group consisting of a high voltage mosfet, a high voltage bipolar transistor, and an insulated, gated bipolar transistor.

9. The regulator of claim 3, further comprising a protector circuit coupled between the drive and the variable impedance, the protector circuit comprising a first zener diode and a second zener diode, the first zener diode oppositely biased with reference to the second zener diode.

10. The regulator of claim 3, wherein the first and second input terminals are operable to receive AC signals and wherein the output terminal and the return terminal are operable to produce DC signals.

* * * * *